(12) United States Patent
Belleville et al.

(10) Patent No.: US 7,820,723 B2
(45) Date of Patent: Oct. 26, 2010

(54) METHOD OF PREPARING A STABLE LEAD ZIRCON-TITANATE SOL AND METHOD FOR PREPARING FILMS BASED ON SAME

(75) Inventors: Philippe Belleville, Tours (FR); Philippe Boy, Jouë lès Tours (FR); Yves Montouillout, Bretteville l'orgueilleuse (FR)

(73) Assignee: Commissariat a l'Energie Atomique (FR)

( * ) Notice: Subject to any disclaimer, the term of this patent is extended or adjusted under 35 U.S.C. 154(b) by 1143 days.

(21) Appl. No.: 10/416,646

(22) PCT Filed: Sep. 19, 2002

(86) PCT No.: PCT/FR02/03206

§ 371 (c)(1),
(2), (4) Date: May 14, 2003

(87) PCT Pub. No.: WO03/024871

PCT Pub. Date: Mar. 27, 2003

(65) Prior Publication Data

US 2004/0014820 A1    Jan. 22, 2004

(30) Foreign Application Priority Data

Sep. 20, 2001  (FR)  ................... 01 12145

(51) Int. Cl.
*C04B 35/624* (2006.01)
*C04B 35/622* (2006.01)
*B01F 3/22* (2006.01)
*H01L 21/8246* (2006.01)
*H01L 27/105* (2006.01)

(52) U.S. Cl. ............... 516/33; 106/287.19; 252/62.9 R; 252/62.9 PZ

(58) Field of Classification Search .................... 516/33, 516/98; 252/69.2 R, 62.9 R, 62.9 PZ; 106/287.19
See application file for complete search history.

(56) References Cited

U.S. PATENT DOCUMENTS 5,958,815 A    9/1999  Loebmann et al. .......... 501/134

6,066,581 A *  5/2000  Chivukula et al. .......... 501/12

FOREIGN PATENT DOCUMENTS

WO    WO 90/13149    * 11/1990

OTHER PUBLICATIONS

"Process and Seeding Effects on Cryitallisation of PZT Thin Films from Sol-Gel Method" Wu et al., *Journal of the European Ceramic Society*, 17, 1997, pp. 1443-1452.
A Study of the Effects of Process Variables on the Properties of PZT Films Produced by a Single-Layer Sol-Gel Technique Tu et al., *Journal of Materials Science*, 30, 1995, pp. 2507-2516.
"Processing of Multilayer PZT Coatings for Device Purposes" Olding et al., *Integrated Ferroelectics*, vol. 26, 1999, pp. 225-241.
"Glycol-Based Sol-Gel Process for the Fabrication of Ferroelectric PZT Thin Films" Livage et al., *Journal of Sol-Gel Science and Technology*, 2, 1994, pp. 605-609.
"Processing and Characterization of Pb(Zr, TI)O3 Films, up to 10 um thick, Produced From a Diol Sol-Gel Route" Tu et al, *J. Mater. Res.*, vol. 11, No. 10, 1996, pp. 1556-2564.
"Characterization of Sol-Gel Pb(Zr0.53Ti0.47)O3 Films in the Thickness Range 0.25-10 um" Kurchania et al., *J. Mater. Res*, vol. 14, No. 5, 1999, pp. 1852-1859.
"Lead Zirconate Titanate Stabel Stock Solution: Characterization and Applications" Wu et al., *Journal of Sol-Gel Science and Technology* 19, 2000, pp. 671-676).

* cited by examiner

*Primary Examiner*—Daniel S Metzmaier
(74) *Attorney, Agent, or Firm*—Hayes Soloway P.C.

(57) ABSTRACT

A method of preparing a sol of lead zirconium titanate, known as PZT, of formula $PbZr_xTi_{(1-x)}O_3$ with $0.45 \leq x \leq 0.7$, comprises the steps of:

(a) preparing a concentrated sol in a diol, the sol comprising a titanium-based precursor, a zirconium-based precursor, and a lead-based precursor;

(b) placing the concentrated sol at ambient temperature without agitation, until a sol is obtained having a constant viscosity as a function of time;

(c) diluting the sol obtained in (b) with a solvent compatible with the diol used in step (a). The sol is useful for preparing PZT-based films for use in the electronics field.

14 Claims, 1 Drawing Sheet

METHOD OF PREPARING A STABLE LEAD ZIRCON-TITANATE SOL AND METHOD FOR PREPARING FILMS BASED ON SAME

TECHNICAL FIELD OF THE INVENTION

The present invention relates to a method of preparing a stable sol of lead zirconium titanate, commonly denoted by the abbreviation PZT, of formula $PbZr_xTi_{(1-x)}O_3$ with $0.45 \leq x \leq 0.7$.

The invention likewise relates to a method of preparing PZT films from the said sol. These PZT films are known for their dielectric, ferroelectric, and piezoelectric properties, among other things, and find application in the microelectronics field, particularly in the design of actuators and of sensors, non-volatile memories, and capacitors.

DESCRIPTION OF THE PRIOR ART

Numerous descriptions of methods of preparing PZT sols exist in the literature, as well as methods of preparation of PZT-based materials, in the form of films, by the sol-gel route.

Document [1]: Integrated Ferroelectrics, 26, 1999, pp. 225-241, proposes the synthesis of a PZT sol, permitting multilayer stacks to be prepared, up to 5 micrometers in thickness, with dielectric constants comprised between 1,100 and 1,300. However, the preparation of the said sol starting from zirconium or titanium propoxide is quasi-systematically accompanied, under the operating conditions stated in this document, by the formation of transitory gels, which gives rise, after heat treatment, to poor quality films. These films comprise, in particular, an intermediate crystalline phase of pyrochlor type which pollutes the perovskite major phase. To compensate for the reduction of the dielectric character due particularly to this intermediate phase, the authors were led to produce films of thickness greater than 2 micrometers.

This type of embodiment consequently cannot find application in the field of nonvolatile memories, for which the film thickness has preferably to be less, than 0.2 micrometers.

The references [2]: "Journal of Sol-Gel Science and Technology", 2, 1994, pp. 605-609, [3]: J. Mater. Res., 1996, 11, No. 10, pp. 2556-2564, and [4]: J. Mater. Res., 1999, 14, No. 5, pp. 1852-1859, describe the preparation of PZT sols intended for the fabrication of films, the preparation taking place in diols. However, the preparation of such sols, according to the operating conditions stated in these documents, does not permit obtaining from them thin films of repeatable and reproducible performance. These modes of preparation thus cannot find application in the industrial production of electronic devices which necessitate the use of PZT-based materials.

Reference [5]: "Journal of Sol-Gel Science and Technology", 2000, 19, pp. 671-676, examines the stability over the period of a year of PZT sols intended for the preparation of thin films having electrical advantageous properties, such as dielectric constants of the order of 1,500. The authors put forward the use of acetone as a solvent responsible for the long-term stability of the sol. However, the study of the course of viscosity revealed a development such that the thickness of films generated under the same conditions increases by nearly 14% during an aging interval of the order of a year for a given sol. This variation in thickness is incompatible with the repeatability necessary in an industrial manufacturing process.

There thus exists a need for a method of preparing PZT sols which would enable sols to be obtained having long-term stability without the occurrence of variations of their physicochemical characteristics (viscosity, state of condensation, etc.) during the course of time.

There furthermore exists a need for a method of preparation of PZT-based films, starting from PZT sols, which would permit films to be obtained having repeatable and reproducible electric performance.

SUMMARY OF THE INVENTION

The object of the invention is thus to provide a method of preparing PZT sols which responds, among other things, to the need mentioned above and which does not have the disadvantages, defects and limitations of the prior art methods of preparation, and which solves the problems inherent in the prior art methods of preparation.

A further object of the invention is to provide a method of preparing PZT films from the said sol, which is, among other things, repeatable and reproducible and of reduced duration, in order to be applicable on an industrial scale.

This method should permit, in particular, obtaining high dielectric constants of the order of 800-900 for very low film thicknesses of the order of 150-220 nm.

By repeatability is to be understood, according to the invention, a process of forming films whose electrical properties, among others, do not vary when the said films are prepared from the same sol at different stages of aging of the said sol.

By reproducibility is to be understood, according to the invention, a method of formation of films whose electrical properties, among others, do not vary when the said films are prepared from different sols, formed under the same operating conditions This object and yet others are attained, according to the invention, by a method of preparation of a sol of lead zirconium titanate, termed PZT, of formula $PbZr_xTi_{(1-x)}O_3$ with $0.45 \leq x \leq 0.7$, comprising successively the following steps:

(a) preparing a concentrated sol in a diol, the said sol comprising a titanium-based precursor, a zirconium-based precursor, and a lead-based precursor;

(b) placing the said concentrated sol at ambient temperature without agitation until a sol is obtained having a constant viscosity as a function of time;

(c) diluting the sol obtained in (b) by a solvent compatible with the diol used in step (a).

In other words, according to the method of preparation of the invention, a sol is prepared at a first step, having a first concentration, by mixing in a diol a titanium-based precursor, a zirconium-based precursor, and a lead-based precursor. It is noted that the precursors, before mixing in the diol, can if necessary be previously solubilized in a solvent identical to or different from the said diol, this solvent having to be miscible with the said diol. At a second step, the thus obtained sol is placed at ambient temperature without agitation, and the viscosity of this sol is measured as a function of time. Once it is observed that the viscosity is stabilized at a substantially constant value, the sol is then diluted with a solvent compatible with the diol used in the first step, the said sol resulting from the dilution having a second concentration lower than the first concentration mentioned By compatible solvent there is to be understood, according to the invention, a solvent identical to or different from the diol used in step (a), this solvent having to be miscible with the diol used in step (a) of the method.

By ambient temperature, there is to be understood, according to the invention, a temperature corresponding to the surrounding environment in which the preparation is performed, this temperature corresponding in temperate latitudes to an average temperature of 20° C. In other words, this means that the step (b) does not require any external heating.

It is specified that according to the invention, concentrations will be expressed in PZT equivalent per unit mass, that is, in percentage per unit mass of product of formula $PbZr_xTi_{(1-x)}O_3$, with respect to the total mass of the sol.

It is specified that, according to the invention, constant value is to be understood to mean a substantially constant value.

This method has the advantage of having a step of stabilization of the PZT sol (corresponding to step (b)). This stabilization of the sol is particularly due to the fact of placing the sol prepared in step (a) at ambient temperature without agitation for a sufficient period to obtain a stabilization of the viscosity of the sol. This step corresponds to a ripening of the concentrated sol. During this ripening phase, the solubilized metallic precursors (that is, the precursors based on lead, titanium and zirconium) condense and are polymerized until reaching an equilibrium state. This polymerization is evidenced by an increase of the viscosity of the sol until it attains a constant value as a function of time when the equilibrium state is reached. This ripening phase is followed, according to the invention, by a dilution, which has the effect to definitively freezing the resulting sol at a viscosity value, thus ensuring reproducibility of layer deposition from sols formed under the same operating conditions, as well as a repeatability of layer deposition, because of the stability of the sol obtained by the method. Failure to respect this phase of ripening results, in particular, in an apparent viscosity of the prematurely diluted sol which is little distinct from that of a sol diluted after this phase has been respected. However, during the deposition as thin layers of a little-ripened sol (that is, a sol for which the ripening phase of the method of the invention, or step (b), has not been respected), it has been observed that the thicknesses generated are less than those obtained with the sol ripened according to the invention and diluted in the same manner. Indeed, the little-ripened sol inevitably has components with a lesser degree of condensation/ramification than the ripened sol.

The invention likewise relates to a method of preparation of films of lead zirconium titanate (known as PZT), of formula $PbZr_xTi_{(1-x)}O_3$ with $0.45 \leq x \leq 0.7$, which comprises successively:

(d) a step of deposition of at least one layer of a sol on a substrate, the said sol being obtained by the method described previously;

(e) a step of drying of the at least one layer for a period and at a temperature effective for permitting a total gelling of the sol;

(f) a step of calcination of the at least one layer at a temperature and for a time effective for eliminating organic products arising form the preparation of the sol;

(g) a step of annealing at a temperature and for a time effective for attaining a densification of the at least one layer.

By organic products there is to be understood, according to the invention, the solvent residues arising from the preparation of the sol, and the organic components arising from the interaction of the metallic precursors.

This method of manufacture of PZT films has the advantage of being a reproducible method, that is, of always giving the same dielectric performance of films for the same conditions of preparation of the sol, and of being a repeatable method, that is, reproducible in time due to the use of a stabilized mixed sol. The mixed sol resulting from the previously described method and having physicochemical characteristics (viscosity, state of condensation of the molecular species in solution, etc.) which remain uniform as a function of time, guarantees a reproducibility and repeatability of the thicknesses deposited on a substrate. Consequently this method, which does not require readjustment of the manufacturing parameters to guarantee a reproducible or repeatable result, can be completely envisaged on an industrial scale.

Other characteristics and advantages of the invention will be better apparent on reading the detailed description and on reading embodiment examples of the invention, of course given by way of illustration and without limitation, with reference to the accompanying drawings.

DETAILED DESCRIPTION OF THE INVENTION

Figure 1:
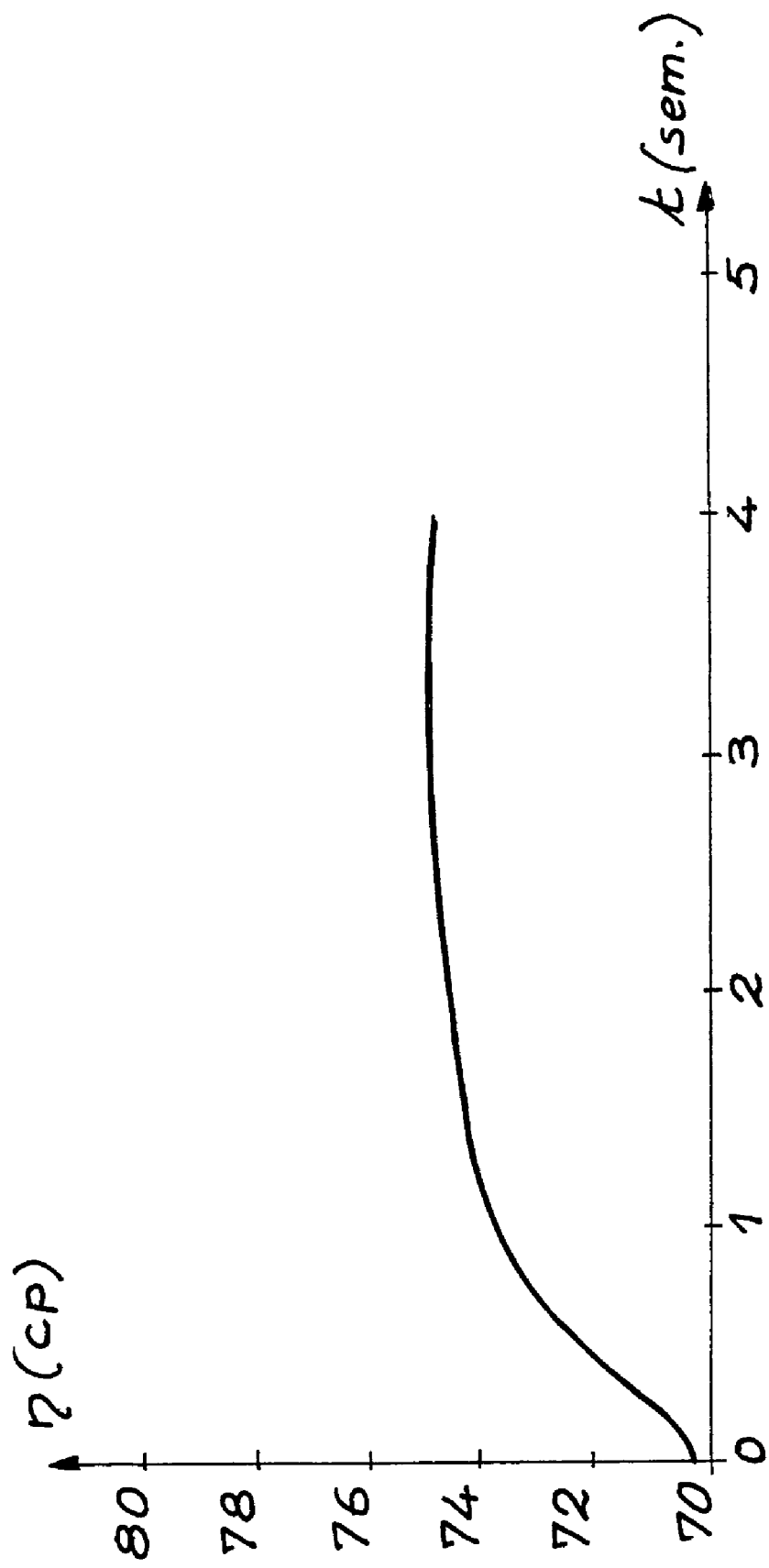
FIG. 1 is a graph illustrating the variation of viscosity $\eta$ (in centipoises cp) of a PZT sol ($PbZr_{0.52}Ti_{0.48}O_3$) concentrated to 26% PZT equivalent per unit mass (the said sol is the result of step (a) of the method) as a function of time t (in weeks), the viscosity measurement being made at ambient temperature.

According to the invention, the method of forming a PZT sol comprises a succession of steps so as to permit finally obtaining a stable sol whose characteristics do not change over time.

To do this, the method requires a first step (step (a)) of preparation of a concentrated sol in a diol by mixing in this diol a titanium-based precursor, a zirconium-based precursor and a lead-based precursor. The preparation of this concentrated sol can be performed by any known method. For example, a particular embodiment consists of preparing a lead-based sol in a diol by dissolving a lead-based precursor in this diol, to which is added a mixed sol based on titanium and zirconium, the said mixed sol being prepared by dissolution of a zirconium-based precursor and a titanium-based precursor in the same diol or in a solvent compatible with the said diol, namely a solvent miscible with the said diol, as is the case of alcohols, particularly propanol. It is specified that the lead-based sol is preferably initially in an excess of 10% with respect to stoichiometry, to the extent that a loss of lead oxide of the same order of magnitude has been observed during the heat treatment of the PZT sol deposited in layer form. The mixture of the said sols can then be brought to reflux, with agitation, at a temperature neighboring the boiling temperature of the reaction mixture. Refluxing can advantageously ensure a homogenization of the sols which have been mixed together. The diol used for the preparation of the mixed sol based on metallic precursors is preferably an alkylene glycol having 2-5 carbon atoms. This type of solvent contributes to facilitating the solubilization of the metallic precursors, particularly in playing a part of chelatant by completing the coordination sphere of the lead, titanium and zirconium.

According to a particular embodiment of the invention, the diol used is ethylene glycol.

According to the invention, the precursors based on lead, titanium and zirconium may be of various kinds, but precursors are preferred which are commercially available and inexpensive.

By way of example, as lead precursor there can be used organic lead salts such as acetates, mineral lead salts such as chlorides, or else organometallic lead compounds such as alcoholates comprising 1-4 carbon atoms. Preferably the lead precursor used, according to the invention, is a hydrated organic salt such as lead acetate trihydrate. This precursor has the advantage of being stable, easily available and cheap. However, during the use of such a hydrated precursor, it is preferable to dehydrate it. Indeed, the presence of water during mixing of the sols together would bring about a premature hydrolysis of the metallic precursors followed by a polymerization. The result of this mixing step would no longer be a mixed sol based on lead, titanium and zirconium, but a resulting gel-form product of mixing and, consequently, a difficulty of depositing the thus formed gel in film form.

For example, the dehydration of lead acetate trihydrate takes place by distillation of the latter in the diol used for performing the mixing of the sols.

The titanium precursors are preferably alkoxides such as titanium isopropoxide. Similarly, the zirconium precursors are preferably alkoxides such as zirconium n-propoxide.

It is noted that at the end of this step of concentrated PZT sol preparation (step (a)), a sol can advantageously be obtained whose concentration is greater than 20% PZT equivalent per unit mass, and is preferably about 20 to about 40% PZT equivalent per unit mass, for example of the order of 26%.

Once mixing of the metallic precursors has been effected, the sol obtained at the end of the first step of the invention undergoes a period of so-called ripening. This period consists of placing the sol, as explained hereinabove, at ambient temperature, without agitation, until a sol is obtained having a constant viscosity as a function of time.

The sol obtained during the first step (step (a)) is preferably placed at ambient temperature, without agitation, for a period of 1-5 weeks.

Once the stabilization of the viscosity of the sol has been observed, the said sol undergoes dilution to reach concentrations lower than in the concentrated sol, particularly facilitating the later use of this sol. Thus, starting from a sol having a concentration greater than 20% PZT equivalent per unit mass, the said sol can thus be diluted to obtain, for example, a sol having a concentration of 1-20% PZT equivalent per unit mass. For example, starting from a sol of 26% concentration, the said sol resulting from the second step of the method, the sol can be diluted so as to obtain a sol of 20% PZT equivalent per unit weight. This dilution, to a determined extent, on the one hand permits the viscosity to be frozen at a given value, and on the other hand, permits the sol to be used to perform in particular deposition of the said sol in the form of layers.

According to the invention, the diluting solvent should be compatible with the solvent for preparation of the concentrated sol. It can be identical to or different from the solvent fro preparation of the said sol, and is preferably chosen among the alcohols.

According to the invention, this stable sol, prepared according to the previously explained method, is intended to be deposited in the form of layers, to constitute, after a suitable treatment, a PZT film, notably having advantageous dielectric properties.

The first step consists in depositing on a substrate the stabilized sol prepared according to the previously described method, in the form of at least one layer.

This deposition can be performed by any technique permitting a deposit to be obtained in the form of thin layers. The thicknesses of the deposited thin layers, according to the invention, can be from 10 to 100 nm.

Deposition is advantageously effected by dip-coating, or else by spin-coating. These techniques particularly facilitate control of the deposited thicknesses and likewise the adjustment of the microstructure (porosity, crystallinity, etc.) of the deposits. As regards the spin-coating technique, the substrate for deposition is placed flat on a rotating support. A volume of sol enabling the said substrate to be covered is then deposited. Centrifugal force spreads the sol in the form of a thin layer.

The layer thickness is in particular a function of the speed of centrifugation and of the concentration of the sol. The parameter of sol concentration in PZT equivalent per unit mass being fixed, those skilled in the art can easily choose the centrifugation speed needed for a desired layer thickness.

According to the invention, the substrate for the deposition may be of various types, but preferably should not contaminate the deposited layer, for example by migration of ions, during the heat treatment and should preferably permit good adhesion of the layer. Its softening temperature should be greater than the heat treatment temperature for the deposited layers, and its coefficient of thermal expansion should be compatible with that of the said layers, to limit the effects of stresses during annealing.

According to the invention, the substrate is preferably a silicon wafer. This type of substrate advantageously has good flatness and excellent surface condition and in particular permits annealing at high temperature without undergoing alterations.

Among other things, it can have a layer of metallization when it is particularly intended to enter into the constitution of semiconductors. It can likewise be oriented, for example with a [111] orientation. This particularly favors a preferential orientation of the deposited layers.

Once the deposition of the sol as a thin layer has been effected, the latter undergoes, according to the invention, a step consisting of a step of drying of the deposited layer at a temperature and for a time effective to ensure gelling of the layer. This step is intended to ensure the evaporation of a portion of the diol-type solvent and a portion of the diluting solvent, and possibly of secondary products, such as esters, arising from the metallic precursors. At the end of this step, the sol is completely transformed into a gel layer of constant thickness, adhering to the surface of the substrate. The temperature and the duration which are effective for ensuring gelling can easily be determined by those skilled in the art, for example by using UV-visible spectrophotometric methods.

For example, the drying step, according to the invention, can be performed at ambient temperature for a period of 1-10 minutes.

According to the invention, the method of forming PZT films comprises, at the end of the transformation of the deposited sol into gel, a heat treatment of the gel.

This heat treatment, according to the invention, firstly has a calcination step performed at a temperature and for a time suitable for eliminating the organic products arising from the preparation of the sol. The calcination temperature is chosen so as to permit the total elimination of the organic compounds of the deposited layer and in particular the solvents for preparation and dilution of the sol and the compounds generated by the interaction of the metallic precursors. The effective temperature and time can easily be determined by those skilled in the art by techniques such as IR (infrared) spectroscopy. The minimum calcination temperature corresponds to a temperature enabling a layer to be obtained free from hydroxyl groups in particular. The disappearance of such groups is verifiable by infrared spectroscopy, particularly by the disappearance of the wide band at about $3,500\,cm^{-1}$. The maximum calcination temperature corresponds to a temperature permitting a layer to be obtained containing nothing but inorganic compounds, that is, a layer whose infrared spectrum has no bands of carbon compounds.

The duration of calcination for a given temperature corresponds to a duration enabling a constant layer thickness to be obtained. The layer thickness is monitored, for example, by UV spectrophotometric techniques. The calcination step is stopped on obtaining a layer of homogeneous thickness, free from organic compounds.

The calcination step is preferably performed at a temperature of from about 300 to about 500° C. and for a time from about 2 to about 15 minutes.

The heat treatment comprises, secondly, an annealing step for a time and at a temperature effective to permit the densification of the deposited layer. The densification of the layer corresponds to obtaining a layer of stabilized thickness and of perovskite-type crystallized structure. The annealing temperature and time are chosen so as to obtain this crystallization, easily verifiable by structural analysis, such as x-ray diffraction analysis. Annealing is preferably effected at a temperature from about 600 to about 800° C. for a time comprised between about 1 and about 5 minutes.

Annealing can be performed by different techniques. Annealing is preferably performed by a rapid mode of heating obtained, for example, with the technique of rapid thermal annealing (RTA).

According to the invention, the film constituted by the deposition of at least one layer permits obtaining, at the end of the heat treatment of the method, a PZT film which is crystallized in a single system corresponding to the perovskite system.

The invention will now be described with reference to the following examples, given by way of illustration and without limitation.

EXAMPLE 1

The following example illustrates, firstly, the preparation of a PZT sol of formula $PbZr_{0.52}Ti_{0.48}O_3$ from a lead-based precursor, lead acetate, and from titanium and zirconium precursor in the form of alkoxides.

The titanium and zirconium alkoxides used are commercial zirconium n-propoxide of concentration 70% by weight in propanol, and titanium isopropoxide. The lead acetate is in the form of the trihydrate.

Viscosity is followed using a capillary tube or rotating cylinder viscosimeter at a temperature of about 20° C.

In this particular embodiment, the preparation of the said sol comprises a preliminary phase of preparation of a dehydrated, lead-based sol.

(a) Preparation of the Lead-Based, Dehydrated Sol

Into a flask equipped with a distillation assembly there are weighed 751.07 g (1.98 mol) of lead acetate trihydrate and 330 g (5.32 mol) of ethylene glycol. The mixture is homogenized at about 70° C. so as to permit dissolution of the lead acetate. The temperature of the obtained homogeneous solution is then increased to dehydrate the lead-based precursor by distillation. 120 g. of distillate are collected and the lead concentration of the sol is of the order of 2.06 mol/kg.

(b) Preparation of the Stabilized Sol of Formula $PbZr_{0.52}Ti_{0.48}O_3$

There are added to 264 g (330 ml) of n-propanol, with agitation under a stream of argon, 225.13 g (0.792 mol) of titanium isopropoxide, and 401.52 g (0.858 mol) of 70% zirconium n-propoxide in n-propanol are added, then 458.7 g (412.5 ml) of ethylene glycol. Agitation is continued for 20 minutes at ambient temperature.

Into a three-necked flask there are weighed 1.815 mol of previously prepared lead precursor sol, representing a 10% excess to remedy the loss of lead oxide (PbO) during the heat treatment of the films. The Ti/Zr-based sol is rapidly introduced under a stream of argon and under strong agitation (600 rpm). At the end of the addition, a condenser with a dessicant guard above it is put in place and the stream of argon is stopped. Heating is effected under reflux for 2 hours (101° C.). While the temperature is rising, the agitation is decreased to 250 rpm. After reflux, a concentrated mixed sol is obtained which has a concentration of the order of 26% PZT equivalent per unit mass. The mixed sol is kept at ambient temperature without agitation until a constant viscosity is obtained as a function of time. In this embodiment example, the mixed sol is maintained for 1 week at ambient temperature without agitation. The concentrated mixed sol is then diluted at 20% PZT equivalent per unit mass, that is, a concentration of 0.75 M, by the addition of ethylene glycol.

FIG. 1 shows the course, as a function of time, of the thermostated measurement (at 20° C.) of the viscosity of the 26% by weight PZT solution (obtained after the first step of the method). Thus, there is seen in FIG. 1 a clear evolution of the viscosity of the PZT sol as a function of time. This evolution reveals, in particular, the increase of the degree of polymerization of the species in solution with the ripening time. Beyond a week of ripening, the viscosity of the mixed sol tends to stabilize, to finally reach a horizontal asymptote corresponding to a constant viscosity of the order of 74 centipoises. The solution may then be diluted (in the last step of the method), which has the effect of definitively freezing the resulting solution at a given value of viscosity.

The method of preparation of sol according to the present invention permits preparation of a sol which is very stable over very long periods.

In order to highlight the stability of sols prepared according to the present invention, measurements of viscosity as a function of time were performed on the sol prepared according to example 1.

The sol obtained after dilution according to example 1 has an initial viscosity of 33.4 centipoises (measured at 20° C.). A new viscosity measurement of this same sol was performed after 12 months of aging. A viscosity of 33.25 centipoises (measurement performed under the same conditions as initially), namely a completely negligible and non-significant change. It consequently can be concluded that chemical modification of the solution during this time period was absent and that thus there was perfect stability with time of the sols prepared according to the method of the invention. The reproducibility of this result was observed for two different preparations, both effected according to the mode of operation described hereinabove.

EXAMPLE 2

This example illustrates the preparation of a film of PZT by deposition on a substrate of three layers of the previously prepared sol. The substrate chosen is a silicon wafer, oriented [111], 12.5-15 cm in diameter, the said wafer being metallized by cathode sputtering of a layer of platinum of thickness from 100 nm to 200 nm serving as lower electrode. The deposition technique used in this example is spin-coating, which permits adjusting, for a sol of given concentration, the deposited thickness by choosing the suitable rotation speed of the device. Deposition is effected in a dust-free zone in order to limit the presence of particulate inclusions in the films and in a conditioned environment (temperature and relative humidity controlled) in order to guarantee the reproducibility of the evaporation conditions.

The sol, diluted to 20% PZT per unit mass, is filtered on a 0.2 μm filter before deposition on the wafer. The speed of rotation is adjusted to 4,000 rpm to effect this deposition, in order to obtain a final thickness per unit layer deposited of from 60 to 70 nm.

The deposited layer is then gelled by 8 minutes of drying at ambient temperature. After the drying and heating of the deposit, the layer undergoes calcination at a temperature of 300° C. for 15 minutes.

After calcination, the deposited layer undergoes a densification treatment by annealing under an air atmosphere at a temperature of 800° C. for 5 minutes.

In this example, the operation of layer deposition followed by the treatment described above is reiterated three times in order to obtain a film of thickness of the order of 195 nm.

The film thus produced is a ceramic material having a thickness of the order of 195 nm and a dielectric constant of the order of 820.

X-ray structural analysis of the prepared film reveals that a single perovskite crystalline phase was obtained with a preferred orientation corresponding to the [111] direction of the substrate. A parasitic phase of the pyrochlor type was never detected with this method of preparation.

EXAMPLE 3

In this example, the reproducibility was studied of the method of formation of PZT-based films.

In order to show the reproducibility of the dielectric performance of films obtained from mixed sols, according to the above example, 4 trials were carried out from 4 sols prepared according to the described method, under the same operating conditions according to examples 1 and 2. The films obtained result from a stacking of three deposited layers on a silicon wafer.

The results are shown in the following table.

| Trial number | Film thickness (in nm) | Capacity (nF/mm$^2$) at 0 V/1 kHz | Dielectric constant at 0 V/1 kHz |
|---|---|---|---|
| 1 | 195 | 37.2 | 816 |
| 2 | 195 | 38.4 | 846 |
| 3 | 190 | 36.9 | 813 |
| 4 | 195 | 37.3 | 821 |

It is seen from these results that the film thicknesses obtained under the same deposition conditions of sols prepared in the same way are similar for these 4 trials, and that the dielectric performances are very comparable.

Hence this method, because of its reproducibility, is completely compatible with an industrial electronic component manufacturing process, for example.

CITED REFERENCES

[1]: Integrated Ferroelectrics, 26, 1999, pp. 225-241.
[2]: Journal of Sol-Gel Science and Technology, 2, 1994, pp. 605-609.
[3]: J. Mater. Res., 1996, 11, No. 10, pp. 2556-2564.
[4]: J. Mater. Res., 1999, 14, No. 5, pp. 1852-1859
[5]: Journal of Sol-Gel Science and Technology, 2000, 19, pp. 671-676.

The invention claimed is:

1. A method for preparation of a sol of lead zircon titanate, termed PZT, of formula PbZr$_x$Ti$_{(1-x)}$O$_3$ with $0.45 \leq x \leq 0.7$, comprising the steps in sequence of:
   (a) preparing a concentrated sol by mixing in a diol a titanium-based precursor, a zirconium-based precursor, and a lead-based precursor;
   (b) holding said concentrated sol at ambient temperature, without agitation, and measuring the viscosity of the sol as a function of time; and
   (c) once the viscosity of said sol attains a constant viscosity as a function of time. diluting the sol obtained in step (b) with a solvent compatible with the diol used in step (a): and wherein the concentrated sol of step (a) has a concentration of from about 20 to about 40% PZT equivalent per unit mass.

2. The method according to claim 1, wherein the concentrated sol of step (a) has a concentration of approximately 26% PZT equivalent per unit mass.

3. The method according to claim 1, wherein the diol is an alkylene glycol with 2-5 carbon atoms.

4. The method according to claim 3, wherein the diol is ethylene glycol.

5. The method according to claim 1, wherein the lead-based precursor is selected from the group consisting of an organic lead salt, a mineral lead salt, and an organometallic lead compound.

6. The method according to claim 5, wherein the organic lead salt comprises an acetate lead salt.

7. The method according to claim 5, wherein the mineral lead salt comprises a chloride salt.

8. The method according to claim 5, wherein the organometallic lead compound comprises an alcoholate having 1-4 carbon atoms.

9. The method according to claim 5, wherein the lead-based precursor comprises lead acetate trihydrate.

10. The method according to claim 1, wherein the titanium-based precursor comprises a titanium alkoxide.

11. The method according to claim 10, wherein the titanium alkoxide comprises titanium isopropoxide.

12. The method according to claim 10, wherein the zirconium-based precursor comprises a zirconium alkoxide.

13. The method according to claim 12, wherein the zirconium alkoxide comprises zirconium n-propoxide.

14. The method according to claim 1, wherein the concentrated sol obtained after step (a) is held at ambient temperature without agitation for a duration of 1-5 weeks.

* * * * *